United States Patent
Lewis (10) Patent No.: US 11,785,061 B2
(45) Date of Patent: Oct. 10, 2023

(54) SYSTEM AND METHOD TO SHARE AN APPLICATION WITH ANOTHER DEVICE

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 14/488,163

(22) Filed: Sep. 16, 2014

(65) Prior Publication Data

US 2015/0081684 A1 Mar. 19, 2015

Related U.S. Application Data

(60) Provisional application No. 61/878,042, filed on Sep. 16, 2013.

(51) Int. Cl.
*H04L 65/403* (2022.01)
*H04L 67/10* (2022.01)
(Continued)

(52) U.S. Cl.
CPC .............. *H04L 65/403* (2013.01); *G06F 8/61* (2013.01); *H04L 67/10* (2013.01); *H04L 67/34* (2013.01)

(58) Field of Classification Search
CPC ......... G06F 8/61; H04L 65/403; H04L 67/10; H04L 67/34
See application file for complete search history.

(56) References Cited

U.S. PATENT DOCUMENTS 6,418,554 B1 * 7/2002 Delo .................... G06F 8/61
717/174
6,523,166 B1 * 2/2003 Mishra ................ G06F 8/61
707/999.104
(Continued)

FOREIGN PATENT DOCUMENTS

CN 101924775 A 12/2010

OTHER PUBLICATIONS

William Enck; On Lightweight Mobile Phone Application Certification; 2009; CCS '09: Proceedings of the 16th ACM conference on Computer and communications security; Nov. 2009; pp. 235-245 (Year: 2009).*

(Continued)

*Primary Examiner* — Albert M Phillips, III
*Assistant Examiner* — Jermaine A Mincey
(74) *Attorney, Agent, or Firm* — McCarter & English, LLP; John S. Curran, Esq.

(57) ABSTRACT

A technique for sharing an application between devices is discussed. Embodiments of the present invention transmit information about an application from a source computing device to a target computing device. An application sharing service on the target computing device then automatically searches the target computing device for a resident corresponding application or its equivalent and if a corresponding application is not found, searches an application store or repository for the corresponding application. If the application or its equivalent is found in the application store or repository, a user may be prompted to download the application or the application may be downloaded automatically. If the corresponding application was found on the target computing device originally, a check may be performed to determine if the most recent update is installed and, if the (Continued)

most recent version is not installed, it may be downloaded from the application store.

18 Claims, 6 Drawing Sheets

(51) Int. Cl.
*G06F 8/61* (2018.01)
*H04L 67/00* (2022.01)

(56) References Cited

U.S. PATENT DOCUMENTS

| | | | | |
|---|---|---|---|---|
| 8,554,836 | B1* | 10/2013 | Wilson | G06Q 30/0214 |
| | | | | 709/203 |
| 8,745,617 | B1 | 6/2014 | Stekkelpak | G06F 9/44505 |
| | | | | 717/173 |
| 8,788,944 | B1* | 7/2014 | Gill | G06F 8/61 |
| | | | | 715/744 |
| 9,065,826 | B2* | 6/2015 | Colvin | G06F 21/53 |
| 9,501,649 | B2* | 11/2016 | Sharma | G06F 21/577 |
| 9,842,235 | B2* | 12/2017 | Enomoto | G06K 7/10386 |
| 2009/0307105 | A1* | 12/2009 | Lemay | G06F 8/61 |
| | | | | 705/26.1 |
| 2011/0258595 | A1* | 10/2011 | Clevenger | G06F 8/40 |
| | | | | 717/106 |
| 2012/0032945 | A1* | 2/2012 | Dare | G06F 3/0481 |
| | | | | 345/418 |
| 2012/0036220 | A1* | 2/2012 | Dare | G06F 8/61 |
| | | | | 709/217 |
| 2012/0084773 | A1* | 4/2012 | Lee | G06F 8/61 |
| | | | | 717/178 |
| 2012/0110568 | A1* | 5/2012 | Abel | G06F 8/61 |
| | | | | 717/178 |
| 2012/0290657 | A1 | 11/2012 | Parks et al. | |
| 2013/0132559 | A1* | 5/2013 | Kotecha | H04L 43/0876 |
| | | | | 709/224 |
| 2013/0282564 | A1* | 10/2013 | Sibbald | H04M 1/72525 |
| | | | | 705/39 |
| 2013/0305218 | A1* | 11/2013 | Hirsch | G06F 8/36 |
| | | | | 717/106 |
| 2013/0326502 | A1* | 12/2013 | Brunsman | G06F 8/61 |
| | | | | 717/178 |
| 2014/0040226 | A1* | 2/2014 | Sadhukha | G06F 8/61 |
| | | | | 707/706 |
| 2014/0114901 | A1* | 4/2014 | Pradhan | G06Q 30/0631 |
| | | | | 706/50 |
| 2014/0280481 | A1* | 9/2014 | Chiussi | H04L 67/10 |
| | | | | 709/203 |
| 2014/0282493 | A1* | 9/2014 | Glover | G06F 8/61 |
| | | | | 717/176 |
| 2014/0317229 | A1* | 10/2014 | Hughes | H04L 67/34 |
| | | | | 709/217 |
| 2014/0359598 | A1* | 12/2014 | Oliver | G06F 8/61 |
| | | | | 717/174 |
| 2015/0205591 | A1* | 7/2015 | Jitkoff | G06F 8/61 |
| | | | | 717/176 |
| 2015/0229655 | A1* | 8/2015 | Savant | G06F 8/61 |
| | | | | 726/22 |
| 2016/0065717 | A1* | 3/2016 | Ilmonen | H04M 1/7253 |
| | | | | 455/410 |

OTHER PUBLICATIONS

Holly Bik; An Introduction to Social Media for Scientists; vol. 11, Issue 4; PLOS; pp. 1-8 (Year: 2013).*

* cited by examiner

SYSTEM AND METHOD TO SHARE AN APPLICATION WITH ANOTHER DEVICE

BACKGROUND

Users of computing devices are able to share data such as songs, movies and photos between computing devices through a variety of mechanisms. For example, computing devices may directly communicate with each other using communication methods such as Short Message Service (SMS), Wi-Fi, BLUETOOTH and Near Field Communication (NFC). Alternatively, computing devices may communicate indirectly using Wi-Fi (over Internet) or a 3G/4G cell network to communicate via a pairing server. Computing devices may also communicate using a hybrid communication method where a small amount of data is transmitted directly and the rest of the data may be transmitted either through a secondary direct channel or an indirect channel. However, it may be difficult for an end user of a computing device such as a mobile device to share an application with another user's computing device, or with another computing device that he or she owns, because the exact application name isn't always known. Further, an application version appropriate for the other computing device's hardware may not have the exact same name.

BRIEF SUMMARY

Embodiments of the present invention transmit information about an application from a source computing device to a target computing device. An application sharing service on the target computing device then automatically searches the target computing device for a resident corresponding application or its equivalent and if a resident corresponding application is not found, searches an application store or repository for the corresponding application. If the application or its equivalent is found in the application store or repository, a user may be prompted to download the application or the application may be downloaded automatically. If the corresponding application was found on the target computing device originally, a check may be performed to determine if the most recent update is installed and, if the most recent version is not installed, it may be downloaded from the application store.

In one embodiment, a computing device-implemented method for improving application correspondence between computing devices includes the step of receiving at a target computing device application information from a source computing device. The method also determines with a service on the target computing device whether an application corresponding to the application information is resident on the target computing device and searches automatically with the service an application store or repository for the application corresponding to the application information following a determination that the application corresponding to the application information is not resident on the target computing device. The method downloads an identified corresponding application from the application store or repository to the target computing device.

In another embodiment, a computing device configured for improved application correspondence with another computing device includes a processor and at least one network interface capable of at least one of direct, indirect and hybrid communication with a source computing device. The network interface is configured to receive application information from the source computing device. The computing device also includes a storage configured to hold at least one application and a service configured to determine whether an application corresponding to the application information is resident on the computing device. The service also automatically searches an application store or repository for the application corresponding to the application information following a determination that the application corresponding to the application information is not resident on the computing device. An identified corresponding application from the application store or repository is downloaded to the computing device.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Embodiments of the present invention provide a mechanism for sharing application information between computing devices so that a target computing device receiving the shared application information from a source computing device automatically identifies and if necessary, downloads and installs, a corresponding application. Application information may be shared between computing devices having different operating systems, different versions and different users. Application information for a selected application is passed between a source computing device and the target computing device. The application information may include a unique identifier of the application, an application version, and may be accompanied by an identifier of the device, operating system and operating system version. For example, a unique identifier may consist of a string (such as "Lewis Foundation Media Player") or a GUID (such as 5569da79-8e13-410a-96cf-5f3c60ee6482) or a number or any other means by which matching applications might be identified for the target computing device. The device, operating system and operating system version information included with the application information may further qualify the application identifier for matching purposes or may be informational. In one example of enhancing matching, an application with unique identifier "A" on operating system "B" may be considered to match an application with unique identifier "C" on operating system "D" by the matching algorithm of the application sharing service executing on the target computing device in the present invention. The application sharing service and the matching algorithm are described further below. This application information may be passed through a "tap" or "bump" mechanism or through some other method by which the source computing device indicates a target computing device.

Figure 1:
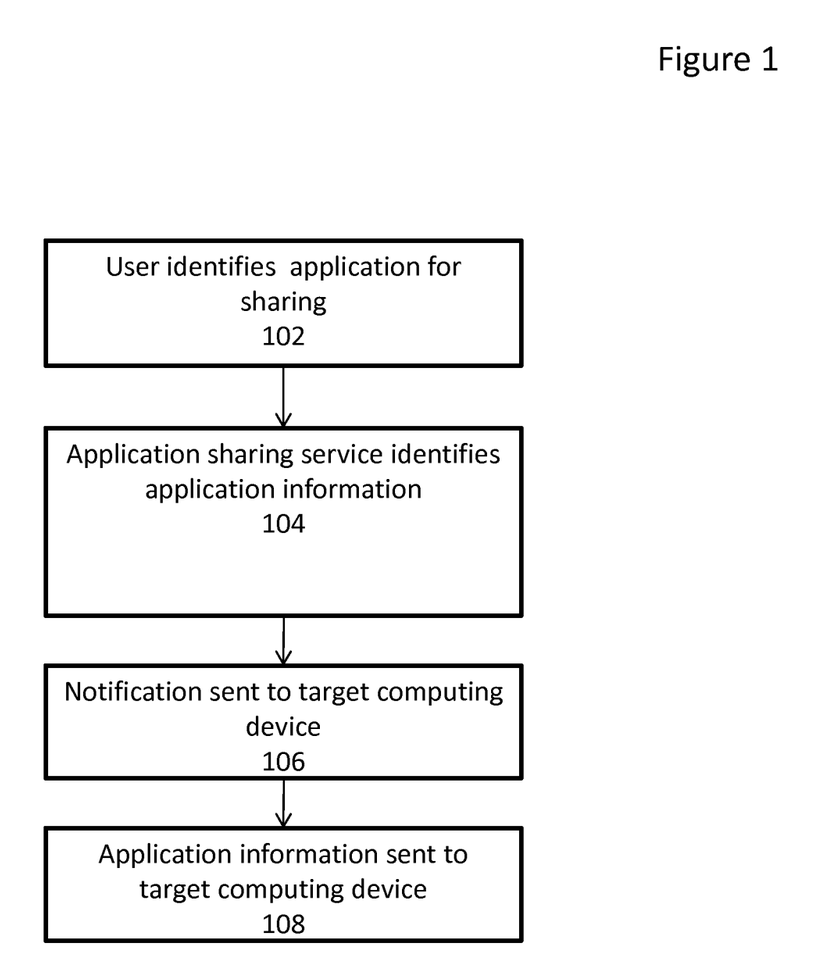
FIG. 1 depicts an exemplary sequence of steps performed by an embodiment of the present invention to identify and share application information between devices.

FIG. 1 depicts an exemplary sequence of steps performed by an embodiment of the present invention to identify and share application information between devices. In one example, a user of a first source computing device such as a mobile phone identifies an application for sharing (step 102). This identification may happen through a special device button, a user interface button, a physical movement of the device (such as a tap or bump), a menu selection, eye tracking, a pointer gesture or other mechanism. Following the selection, an application sharing service on the source computing device identifies application information associated with the identified application (step 104). The source computing device may first send a notification to a target computing device (step 106) and then, after an acknowledgement, send the application information to the target computing device (step 108). In another embodiment, the source computing device may send the information without first sending the notification. In another embodiment, instead of passing application information to another individual target computing device, the source computing device may pass application information to a predefined list of devices that have been configured to receive notifications from the source computing device. The source computing device and the target computing device may communicate via a number of different communication protocols and may communicate in a direct, indirect or hybrid manner. In one form of communication, a pairing server may be used in the communication process. The source and target computing devices may be mobile computing devices, desktop computers, smart phones, laptops, servers or other types of devices equipped with a processor, a communication interface and able to communicate in some manner with each other.

Figure 2:
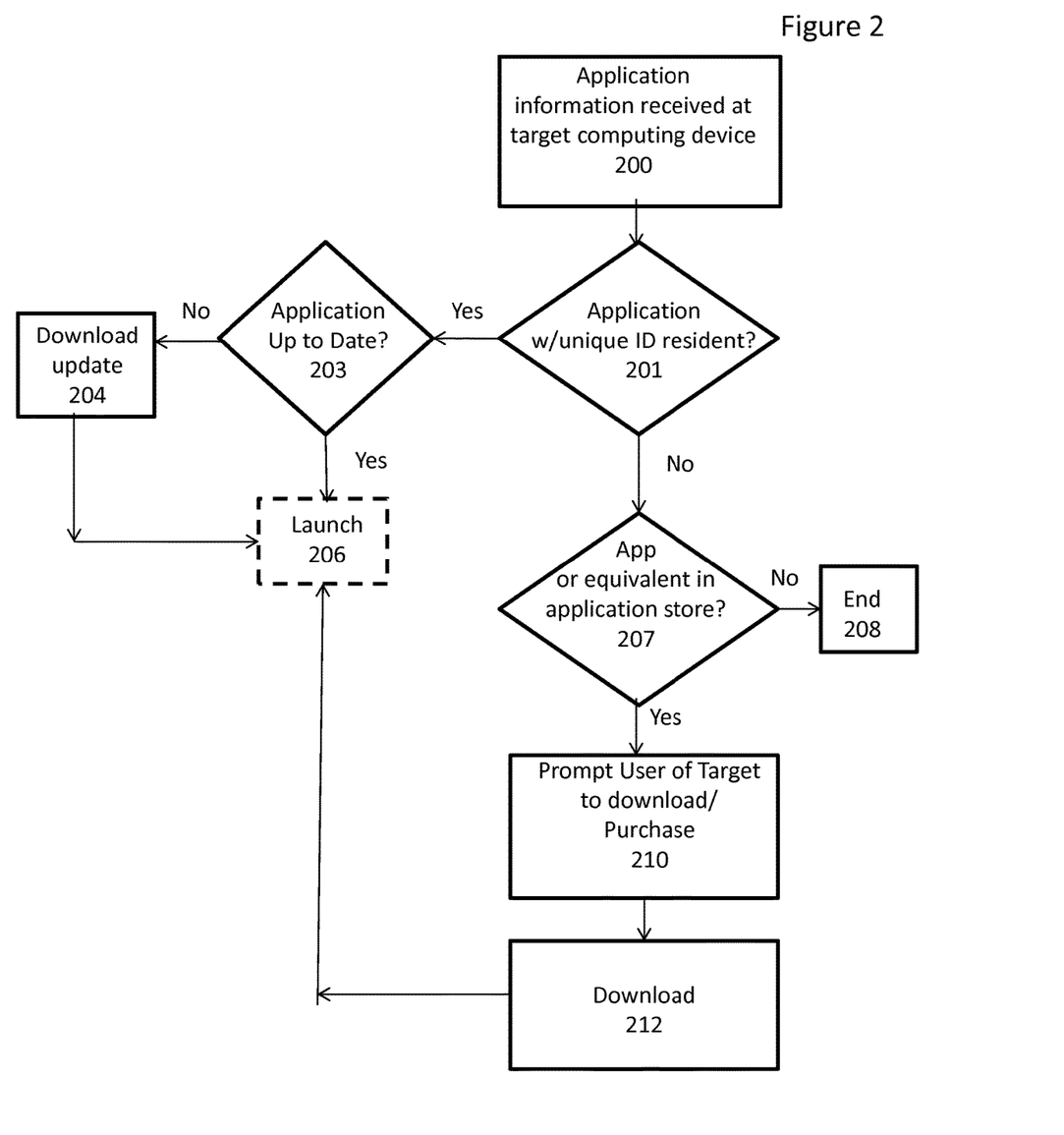
FIG. 2 depicts an exemplary sequence of steps performed by an embodiment of the present invention to receive shared application information and identify a resident corresponding application on a target computing device.

FIG. 2 depicts an exemplary sequence of steps performed by an embodiment of the present invention to receive shared application information and identify a resident corresponding application on a target computing device. The sequence starts with a target computing device receiving shared application information from a source computing device (step 200). When the target computing device receives the information, an application sharing service running on the target computing device determines if an application with the shared application unique identifier is resident on the target computing device (step 201). The determination as to whether an application with the unique identifier is resident on the target computing device is performed by the application sharing service which compares the received application information with information associated with applications resident on the target computing device. The determination process is described in more detail below. If an application with the unique identifier is resident on the target computing device (step 201), a check may be performed to see if the application is up to date, i.e.: whether it the same version as on the source computing device or is a later version (step 203). If the application is up to date, the application may be launched (step 206). If the application is not up to date, the application is first updated by downloading the updated version from an application store used by the target computing device (step 204) after which the application may be launched (step 206). In one embodiment, the downloading of the update is an automated process that takes place without user interaction. In another embodiment, the user is prompted before the download of the update takes place.

Continuing with the sequence of FIG. 2, if the application or its equivalent was not initially resident on the target computing device (step 201), the application sharing service running on the target computing device attempts to find the application with the application unique identifier or a corresponding application in an application store, or from zero or more alternate application stores or repositories (step 207). As used herein, an application store may also include some form of personal "store" service or stores provided by specific vendors. The application store may be remotely located from the target computing device and accessed over a network. As described further below, in one embodiment, the application match between an application found in the store (or application found on the target computing device) and the shared application information may not be exact, but a matching algorithm including similarity of name or a look up in a database of applications can be used to suggest a match. If the application or its equivalent is not found in the store, the process ends (step 208). Alternatively, if the corresponding application or its equivalent is found in the store, the user of the target computing device may be prompted to download or purchase the application (or the application may be downloaded automatically depending on configuration of the application sharing service) (step 210). In one embodiment, a default procedure proceeds with download if the specified application has no cost or has already been purchased by the owner of the target computing device. After the application or its equivalent has been downloaded to the target computing device (step 212), it may be automatically or manually launched (step 206).

Figure 3:
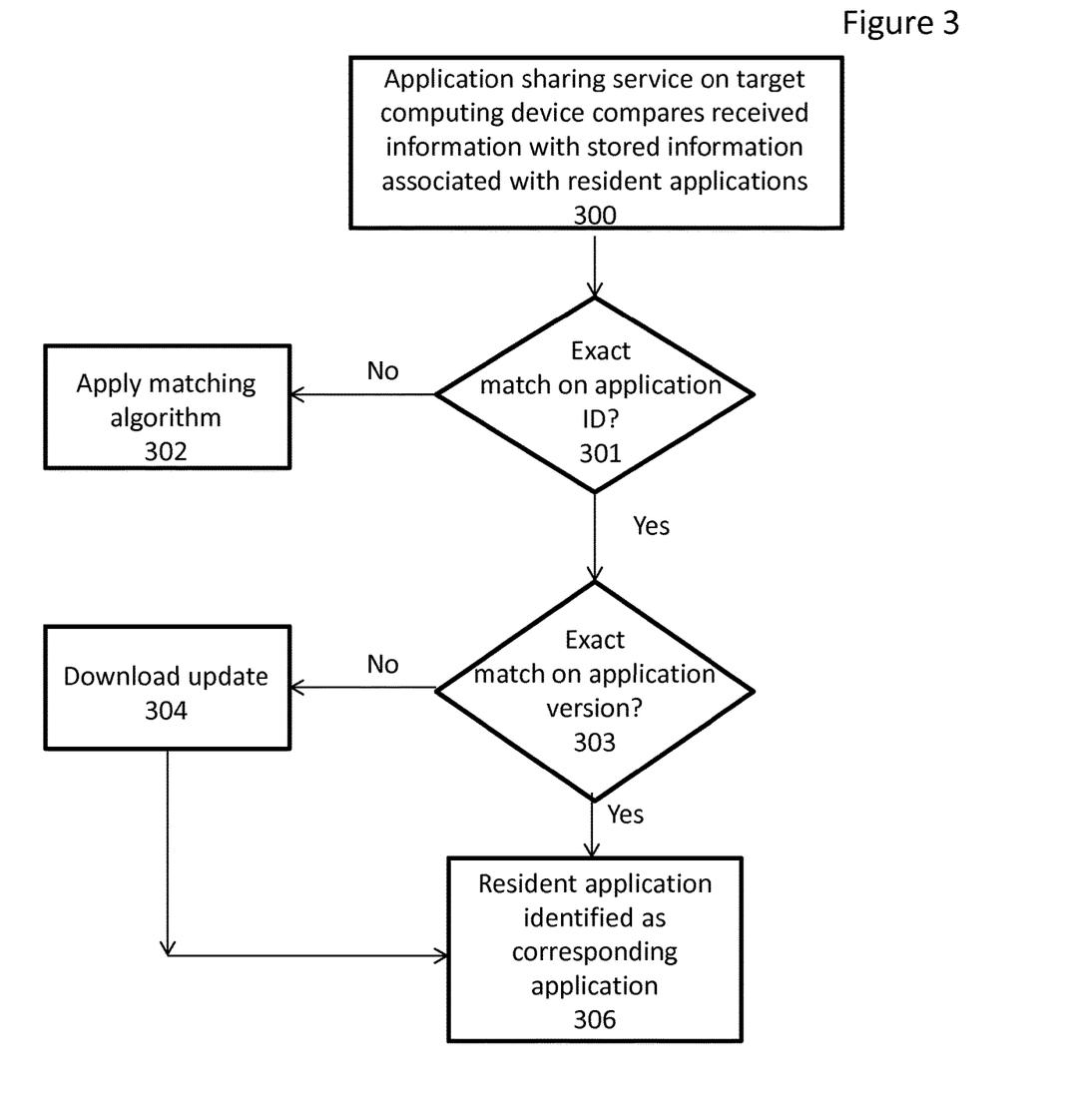
FIG. 3 depicts an exemplary sequence of steps performed by an embodiment of the present invention to compare received shared application information from a source computing device with application information associated with applications already resident on a target computing device.

FIG. 3 depicts an exemplary sequence of steps performed by an embodiment of the present invention to compare received shared application information from a source computing device with application information associated with applications already resident on a target computing device. The sequence begins when an application sharing service on a target computing device compares received application information with stored information associated with resident applications (step 300). The application sharing service determines whether there is an exact match for the application identifier (step 301). If there is not an exact match of the application identifier (step 301), the application sharing service applies a matching algorithm to determine if there is a close match (step 302). The matching algorithm is discussed further below with respect to FIGS. 4 and 5. If there is an exact match of the application identifier between a resident application and the shared application information (step 301), the application sharing service next determines whether the resident application is an exact match of the application version information contained in the shared application information (step 303). If the application version is an exact match (step 303) then the resident application is identified as a corresponding application by the application sharing service (step 306). Similarly, if the application version of the resident application matching the application identifier is not determined to be an exact version match (step 303), then an updated version corresponding to the application information (a same version or later version of that listed in the shared application information) is downloaded from an application store (step 304). Upon retrieval, the new version of the application is identified as a corresponding application by the application sharing service (step 306).

Figure 4:
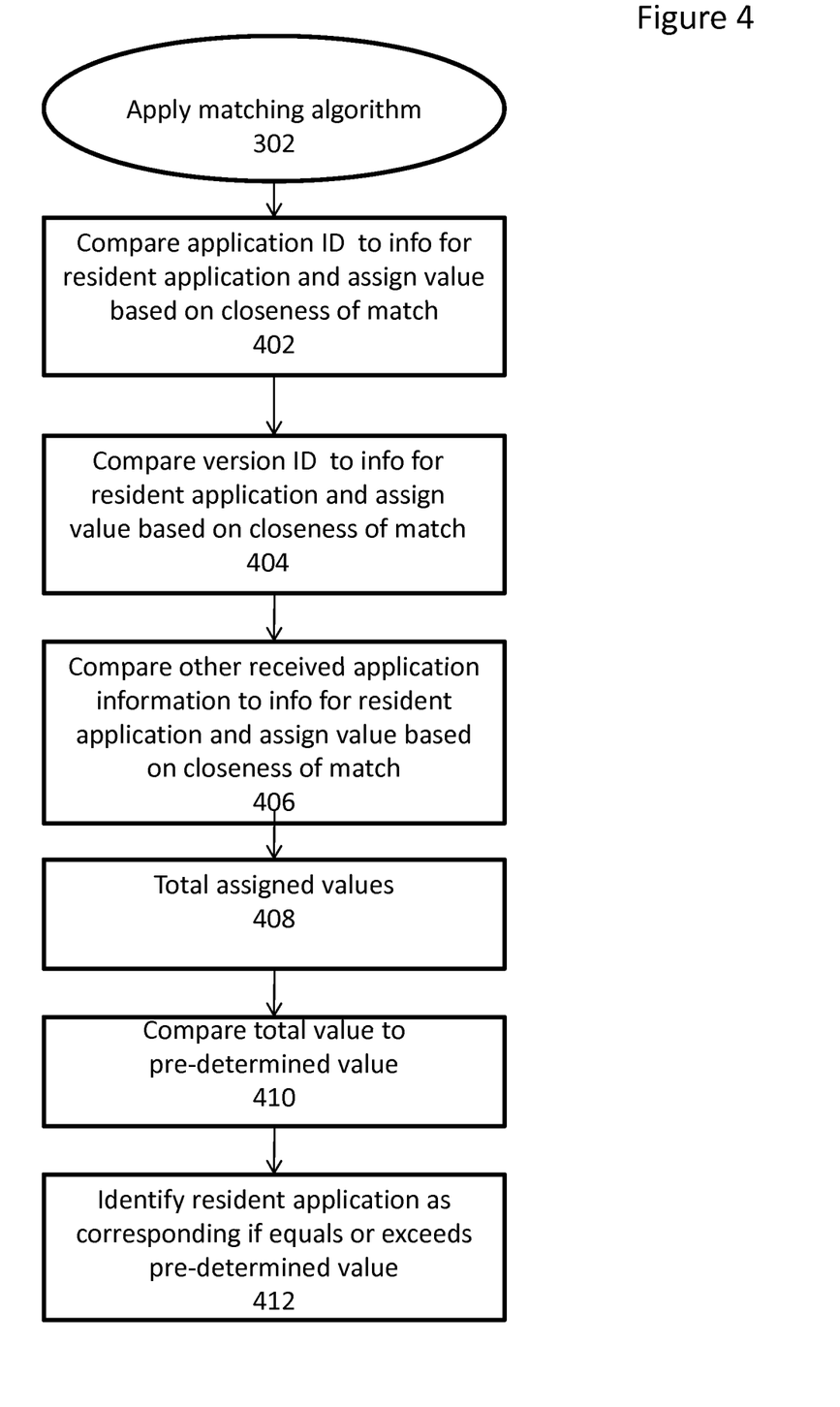
FIG. 4 depicts an exemplary sequence applying the matching algorithm used by the application sharing service of the present invention to resident application information.

As noted above, a matching algorithm may be employed by the application sharing service of the present invention to attempt to identify "close" matches of resident application information and the shared application information. FIG. 4 depicts an exemplary sequence applying the matching algorithm used by the application sharing service of the present invention to resident application information. The sequence begins by comparing the application identifier for each resident application to the application identifier in the shared application information and assigning a value based on the closeness of the match (step 402). The exact nature of the comparison performed by the matching algorithm will depend upon the nature of the shared application identifier. If the application identifier in the shared application information is an application name, the matching algorithm may attempt to identify how different the name of the resident application is from the name of the application in the shared application information. In one example, this comparison may be done with a spell checker. In another example, this comparison may be done with an updated database of matching applications provided by a service, listing the source device's application, the target device's application and a relative score showing the closeness of the match. In this scenario, MICROSOFT WORD may "match" OPENOFFICE with a score of 75. The scores provided by the matching algorithm may be hand-generated or automatically adjusted from some base value by how often another application in the database is subsequently chosen. If the application identifier in the shared application information is a number, the matching algorithm may attempt to identify how different the identifying number of the resident application is from the number of the application in the shared application information. For example, the applications may be looked up in a pairing database showing the source computing device's application number, the target computing device's application number and a relative score indicating the relative priority of the match. In one embodiment, the user may choose from among the top choices. The relative score may have been hand-scored or automatically generated based on user feedback or subsequent user behavior (such as making another choice subsequently). The matching algorithm may also compare the version identifier for each resident application to the version identifier in the shared application information and assign a value based on the closeness of the match (step 404). In the event of a difference between version numbers, predetermined values may be used by the matching algorithm based on the size of the discrepancy. The matching algorithm may also compare any other received application information to information associated with each resident application and assign a value based on the closeness of the match (step 406). The other received information may include for example, a unique identifier of the source computing device, operating system and operating system version. It should be appreciated that the matching algorithm may also compare all or only a subset of the different types of information discussed herein and may also compare other application information shared by the source computing device instead of, or in addition to, the discussed types of information without departing from the scope of the present invention. It should further be appreciated that the descriptions of the matching algorithm contained herein are exemplary and other types of algorithms comparing application information may be employed without departing from the scope of the present invention.

Once the matching algorithm is done comparing the shared information to the information associated with the resident applications, the different values assigned for the different comparisons are totaled for each resident application (step 408). The total value may be compared to a pre-determined value (step 410) and if the total value equals or exceeds the pre-determined value, the resident application may be identified as corresponding by the matching algorithm and the application sharing service (step 412).

Figure 5:
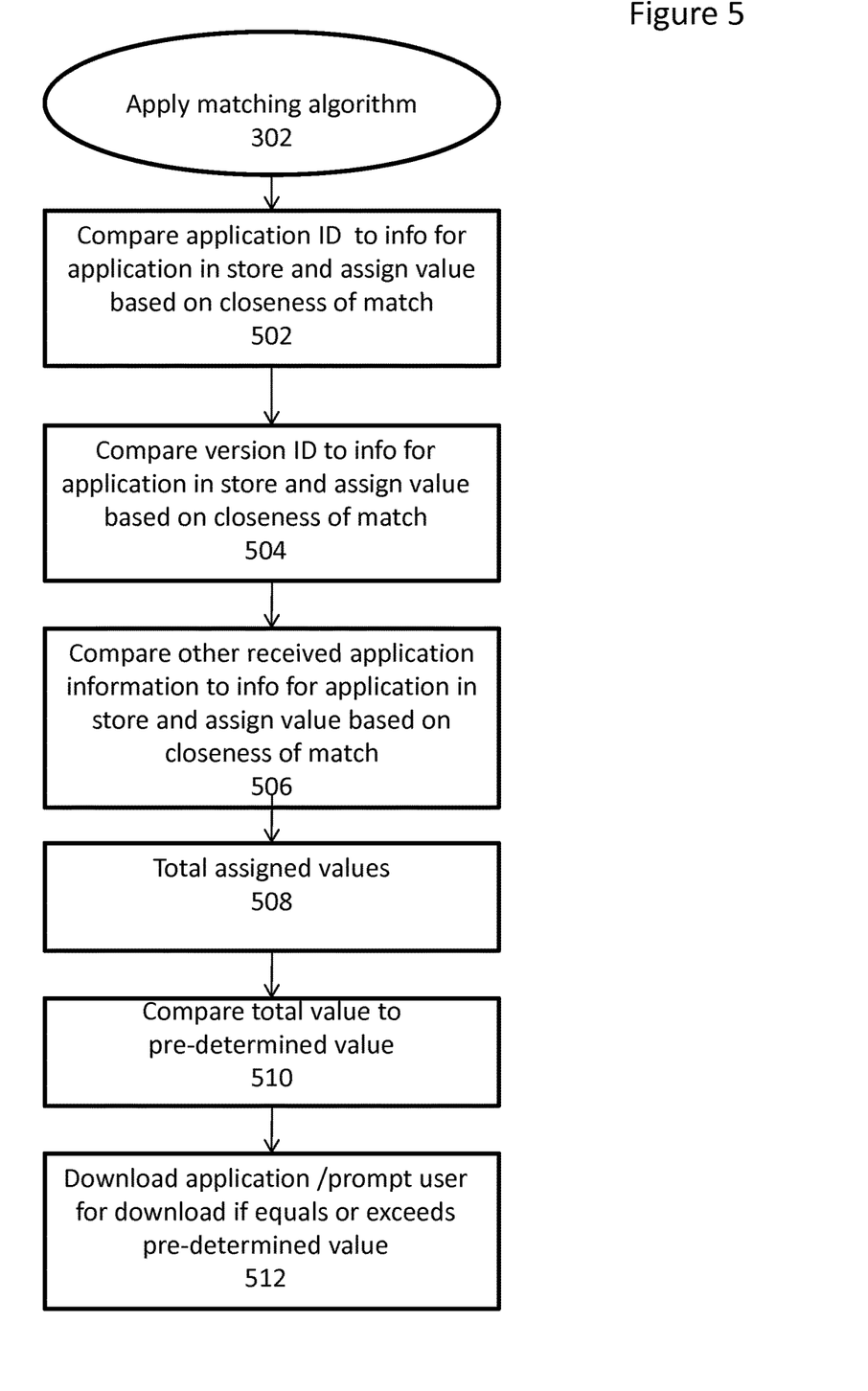
FIG. 5 depicts an exemplary sequence applying the matching algorithm used by the application sharing service of the present invention to application information in the application store.

The matching algorithm may be also employed by the application sharing service of the present invention to attempt to identify "close" matches between application information for applications in an application store and the shared application information. FIG. 5 depicts an exemplary sequence applying the matching algorithm used by the application sharing service of the present invention to application information in an application store accessible to the target computing device. The sequence begins by comparing the application identifier for each application in the application store to the application identifier in the shared application information and assigning a value based on the closeness of the match (step 502). As noted above, the exact nature of the comparison performed by the matching algorithm will depend upon the nature of the shared application identifier. The matching algorithm also compares the version identifier for each application in the application store to the version identifier in the shared application information and assigns a value based on the closeness of the match (step 504). The matching algorithm may also compare any other received application information to information associated with each application in the application store and assign a value based on the closeness of the match (step 506). Once the matching algorithm is done comparing the shared information to the information associated with the applications in the application store, the different values assigned for the different comparisons are totaled for each application store application (step 508). The total value may be compared to a pre-determined value (step 510) and, if the total value equals or exceeds the pre-determined value, the application store application may be identified as corresponding by the matching algorithm and the application sharing service and the user may be prompted to download the application (step 512). In another embodiment, the application may be automatically downloaded.

Figure 6:
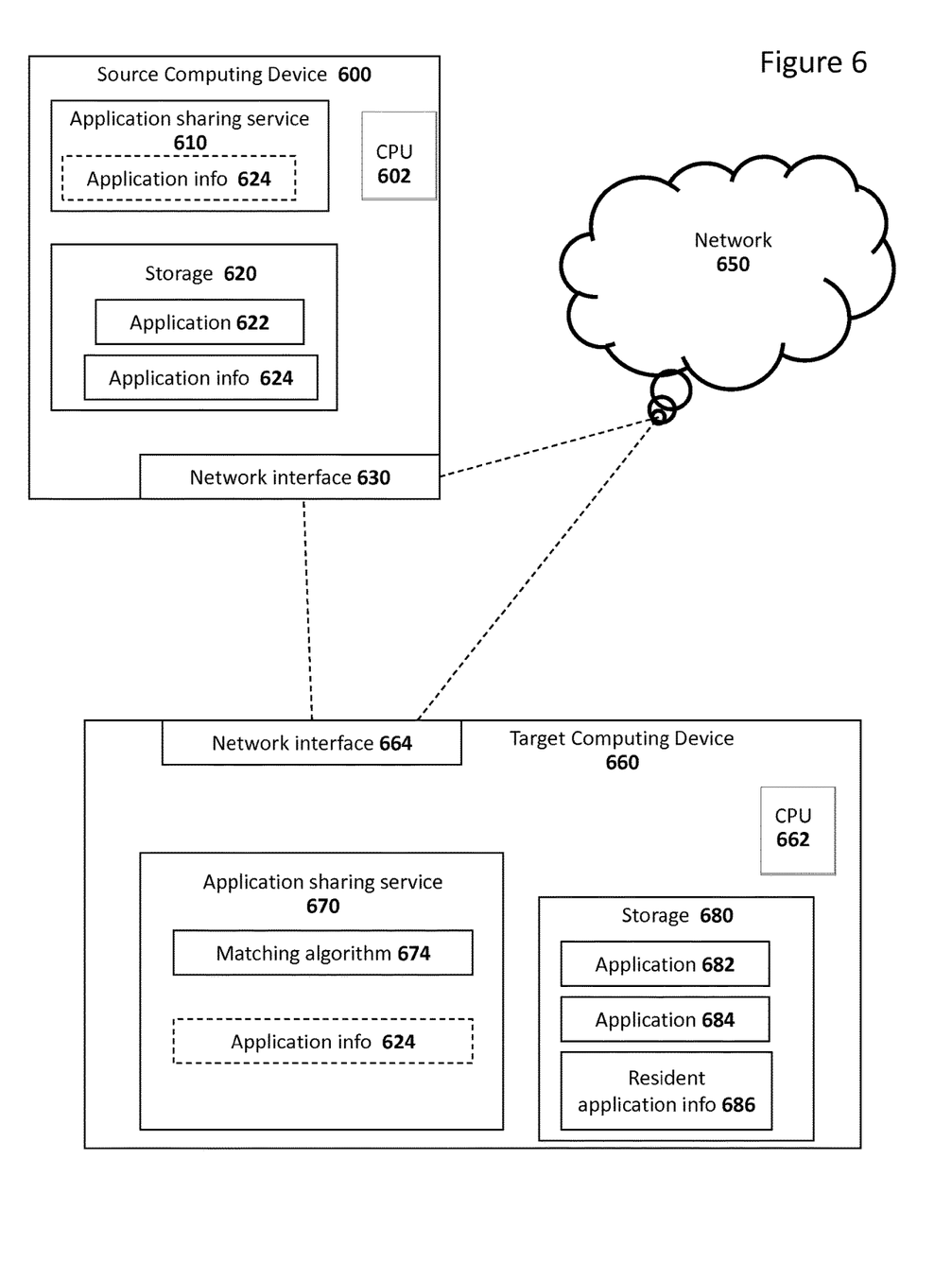
FIG. 6 depicts an exemplary environment suitable for practicing an embodiment of the present invention.

FIG. 6 depicts an exemplary environment suitable for practicing an embodiment of the present invention. A source computing device 600 includes a CPU 602, an application sharing service 610 and storage 620. Storage 620 holds at least one application 622 and application information 624 associated with application 622. For example, application information 624 may include an application identifier and application version for application 622. Upon application 622 being selected for sharing by a user of the source computing device 600, application sharing service 612 may retrieve application information 624. Application sharing service 610 may transmit application information 624 from target computing device 600 to source computing device 660 via network interfaces 630 and 664. Application information 624 may be transmitted by a direct communication channel such as one employing SMS, Wi-Fi, BLUETOOTH or NFC and/or may be transmitted indirectly via network 650 and a pairing server (not shown).

Target computing device 660 includes CPU 662, application sharing service 670 and storage 680. Storage 680 may hold multiple resident applications 682 and 684 and resident application information 686 associated with the applications. Application sharing service 670 may include a matching algorithm such as described herein and receives the shared application information 624 transmitted by the source computing device. Application sharing service 670 may use matching algorithm 674 to compare shared application information 624 with resident application information 686 to attempt to identify a corresponding resident application on target computing device 660 (corresponding to application 622 on source computing device 600). As described above, matching algorithm 674 may also be used to determine a corresponding application in an application store (not shown) if a resident corresponding application cannot be identified.

In one embodiment, instead of an application unique identifier, the source computing device may pass another type of identifier such as a book unique identifier (ISBN) or song unique identifier to the target computing device. These identifiers would be shared when the application match is related to another type of media. For example, an app that was tied to a specific song or book or movie. For example, movie A might have a related children's game Z, a "songs inspired by album", a "sound track" album", and a movie studio app.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computing device-implemented method for improving application correspondence between computing devices, comprising:

receiving at a target computing device application information from a source computing device relating to an application executable on the source computing device, the application information including an application identifier and application version, the application information identified by an application sharing service on the source computing device, a transfer of the application information initiated by a user of the source computing device; and executing a service on the target computing device that: uses the transferred application information received from the source computing device and information associated with a plurality of applications resident on the target computing device to generate a match result, the that an application identifier in the transferred application information received from the source computing device is not an exact match to an identifier for any of a plurality of applications resident on the target computing device;

requests automatically, based on the generated match result, a database lookup for the application identifier, the database containing a plurality of relative scores respectively indicating a closeness of match between the application identifier and each of a plurality of potentially corresponding applications in an application store or repository, wherein the plurality of relative scores are automatically adjusted from a base value based upon how often the potentially corresponding applications in the application store or repository are selected by users;

displays a list of the plurality of relative scores to a user of the target computing device;

receives a selection of one of the potentially corresponding applications from the user of the target computing device; and downloads the selected one of the potentially corresponding applications without further user interaction from the application store or repository to the target computing device.

2. The method of claim 1 wherein the service determines whether an application resident on the target computing device corresponds to the application information by:

applying a matching algorithm to the application information and information associated with each of a plurality of applications resident on the computing device;

providing a scored result of the applying for each of the plurality of applications based on a degree of a match between the application information and information associated with each of the plurality of applications resident on the computing device; and generating a list of the scored results for at least some of the plurality of applications.

3. The method of claim 2 wherein the service applies a predetermined criteria to the list of scored results to identify an application corresponding to the application information that is resident on the target computing device.

4. The method of claim 2 wherein the service displays the list to a user of the target computing device and requests the user identify an application corresponding to the application information that is resident on the target computing device.

5. The method of claim 1, further comprising:

receiving the application information at the target computing device via a direct communication method with the source computing device.

6. The method of claim 1, further comprising:

receiving the application information at the target computing device via an indirect or hybrid communication method with the source computing device, the hybrid communication method including direct and indirect communication between the source computing device and the target computing device.

7. The method of claim 1 wherein the application information includes an operating system identifier.

8. A non-transitory medium holding computer-executable instructions for improving application correspondence between computing devices, the instructions when executed causing a target computing device to:

receive application information from a source computing device relating to an application executable on the source computing device, the application information including an application identifier and application version, the application information identified by an application sharing service on the source computing device, a transfer of the application information initiated by a user of the source computing device; and execute a service on the target computing device that:
   uses the transferred application information received from the source computing device and information associated with a plurality of applications resident on the target computing device to generate a match result, the match result indicating that an application identifier in the transferred application information received from the source computing device is not an exact match to an identifier for any of a plurality of applications resident on the target computing device;
   requests automatically, based on the generated match result, a database lookup for the application identifier, the database containing a plurality of relative scores respectively indicating a closeness of match between the application identifier and each of a plurality of potentially corresponding applications in an application store or repository, wherein the plurality of relative scores are automatically adjusted from a base value based upon how often the potentially corresponding applications in the application store or repository are selected by users;
   displays a list of the plurality of relative scores to a user of the target computing device;
   receives a selection of one of the potentially corresponding applications from the user of the target computing device; and
   downloads the selected one of the potentially corresponding applications without user interaction from the application store or repository to the target computing device.

9. The medium of claim 8 wherein the service determines whether an application resident on the target computing device corresponds to the application information by:
   applying a matching algorithm to the application information and information associated with each of a plurality of applications resident on the computing device;
   providing a scored result of the applying for each of the plurality of applications based on a degree of a match between the application information and information associated with each of the plurality of applications resident on the computing device; and
   generating a list of the scored results for at least some of the plurality of applications.

10. The medium of claim 9 wherein the service applies a predetermined criteria to the list of scored results to identify an application corresponding to the application information that is resident on the target computing device.

11. The medium of claim 9 wherein the service displays the list to a user of the target computing device and requests the user identify an application corresponding to the application information that is resident on the target computing device.

12. The medium of claim 8 wherein the instructions when executed further cause the target computing device to:
   receive the application information at the target computing device via a direct communication method with the source computing device.

13. The medium of claim 8 wherein the instructions when executed further cause the target computing device to:
   receive the application information via an indirect or hybrid communication method with the source computing device, the hybrid communication method including direct and indirect communication between the source computing device and the target computing device.

14. The medium of claim 8 wherein the application information includes an operating system identifier.

15. A target computing device configured for improved application correspondence with a source computing device, comprising:
   a processor;
   at least one network interface capable of at least one of direct, indirect and hybrid communication with the source computing device, the network interface configured to receive application information from the source computing device relating to an application executable on the source computing device , the application information including an application identifier and application version, the application information identified by an application sharing service on the source computing device, a transfer of the application information initiated by a user of the source computing device;
   storage configured to hold at least one application; and
   a service configured to execute on the target device that:
      uses the transferred application information received from the source computing device and information associated with a plurality of applications resident on the target computing device to generate a match result, the match result indicating that an application identifier in the transferred application information received from the source computing device is not an exact match to an identifier for any of a plurality of applications resident on the target computing device,
      requests automatically, based on the generated match result, a database lookup for the application identifier, the database containing a plurality of relative scores respectively indicating a closeness of match between the application identifier and each of a plurality of potentially corresponding applications in an application store or repository, wherein the plurality of relative scores are automatically adjusted from a base value based upon how often the potentially corresponding applications in the application store or repository are selected by users;
      display a list of the plurality of relative scores to a user of the target computing device;
      receive a selection of one of the potentially corresponding applications from the user of the target computing device, and
      download the selected one of the potentially corresponding applications from the application store or repository to the target computing device.

16. The target computing device of claim 15 wherein the network interface is capable of direct communication with the source computing device and one of a radio communication protocol and a text message protocol is used to communicate with the source computing device.

17. The method of claim 1 wherein the source computing device executes a first operating system and the target computing system executes a second operating system, wherein the first and second operating systems are different and the application is executable by the first operating system.

18. The medium of claim 8 wherein the source computing device executes a first operating system and the target computing system executes a second operating system, wherein the first and second operating systems are different and the application is executable by the first operating system.

* * * * *